United States Patent Office 2,860,356
Patented Nov. 18, 1958

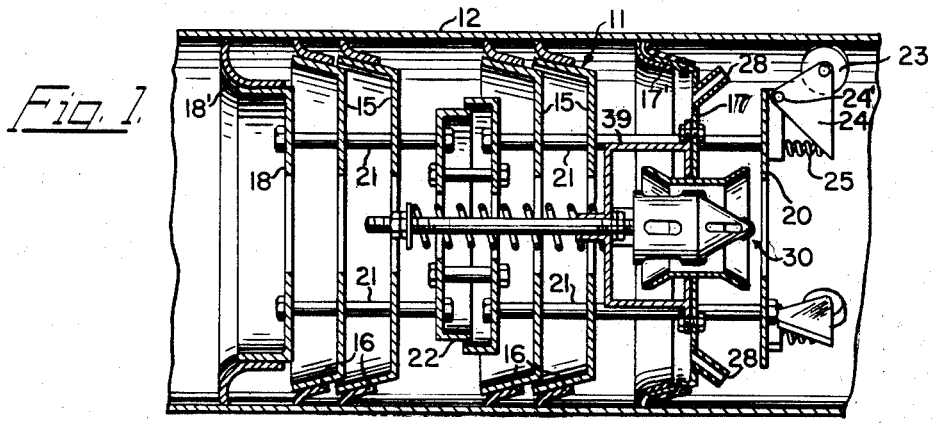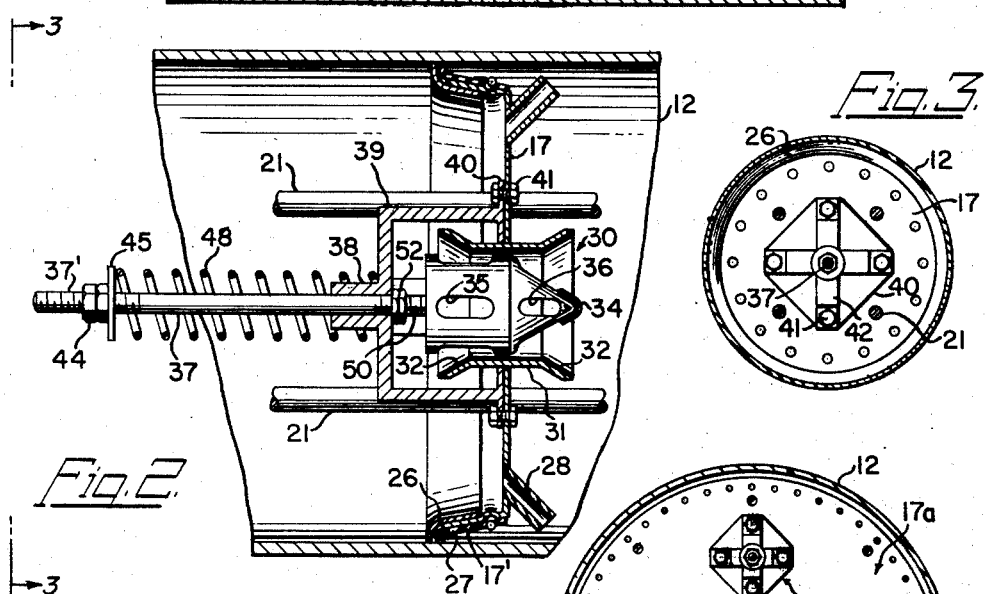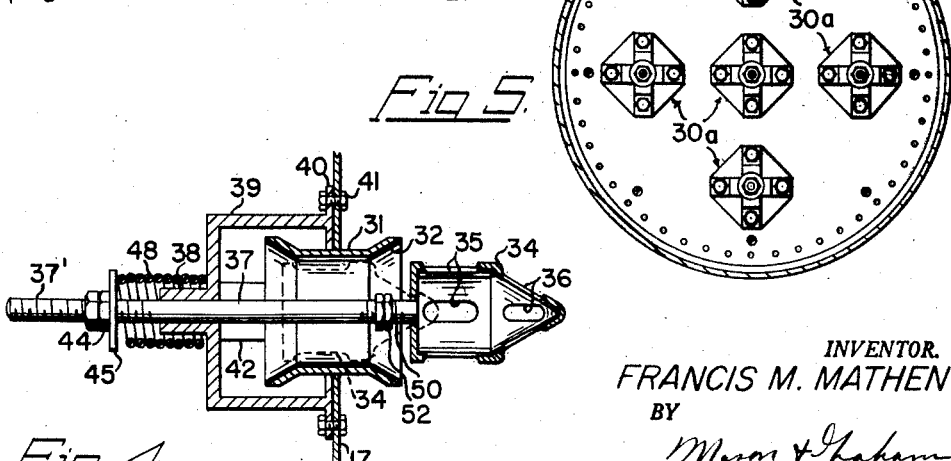

2,860,356

PIPE-CLEANING MACHINE

Francis M. Matheny, Lynwood, Calif., assignor to Pipe Linings, Inc., Wilmington, Calif., a corporation of Delaware Application June 17, 1957, Serial No. 666,064

5 Claims. (Cl. 15—104.06)

This invention has to do with means for cleaning pipelines and more particularly with means for controlling the speed of travel and discharge of water through a hydraulically propelled pipe-cleaning machine.

It is common practice in cleaning pipelines to utilize machines which are forced through the pipe by the pressure of water admitted to the pipeline behind the device. These machines usually embody a head which fits slidably in the pipe and is propelled through the pipeline much like a piston in a cylinder. Scrapers and/or brushes are associated with the head. Customarily such machines provide means whereby some water is passed through the machine in order to flush away debris from in front of the machine. In view of the fact that the condition of the pipe varies along the pipeline, the resistance to movement of the machine, which is dependent largely upon the engagement of brushes and scrapers thereof with the pipe wall, also varies. Consequently, it has heretofore been necessary to predetermine the amount of liquid which may be passed through the machine and still retain enough pressure behind the machine to insure its movement. Various makeshift methods have been used to do this and so far as I know, there has been no satisfactory way of accomplishing this nor of providing for varying the amount of water allowed to pass through the machine in accordance with conditions in the pipe which may affect the resistance to travel and speed of the machine. The machines have heretofore thus not been suited to compensating for various conditions along the length of the pipe.

An object of my invention is to provide, in a machine for cleaning pipe of the nature indicated, means for automatically regulating or adjusting the flow of water through the machine in accordance with conditions as they are encountered along the length of a pipeline.

A further object is to provide novel means in a pipe-cleaning machine, which can be set or adjusted to permit a given flow of water through the machine under given conditions and which automatically reduces the permissible flow through the device when the same is retarded in its movement through the pipe by encountering heavy encrustation or tuberculation and, further, which provides, as a safety feature, for the release of a greater quantity of water through the device in the event of conditions in the pipe which would completely stop the progress of the machine.

More particularly it is an object to provide a novel valve means in a pipe-cleaning device which is operable to accomplish the above objects but may have other uses as well.

These and other objects will be apparent from the drawing and the following description. Referring to the drawing, which is for illustrative purposes only:

Fig. 1 is a central sectional view through a device embodying the invention shown within a pipe;

Fig. 2 is an enlarged sectional view of a portion of the device of Fig. 1;

Fig. 3 is a sectional view on line 3—3 of Fig. 2, but on a reduced scale;

Fig. 4 is a view similar to Fig. 2, but showing the parts in a different position; and Fig. 5 is a view similar to Fig. 3 showing a modification.

More particularly describing the invention, in Fig. 1 I show a pipe-cleaning machine or device 11 within a pipe 12. The machine includes a plurality of axially spaced annular plates 15 with scrapers 16, a forward plate or head 17, a trailing plate 18 with scrapers 18', and a guide plate 20. These are secured together by bolts 21 and a center assembly 22. The plates 15 and head 17 may be welded to the bolts to maintain the spacial relationship of the parts. Guide plate 20 is provided with a plurality of wheels 23 mounted on brackets 24, pivoted at 24' and biased by springs 25 to urge the wheels toward the pipe.

The forward plate or head 17 is provided with an inclined or conoidal flange, designated 17', provided with a rim 26. A flexible seal ring or packing member 27 is provided around the flange 17' for sealing engagement with the wall of the pipe.

The machine is moved from left to right through the pipe as shown in Fig. 1 by means of water under pressure supplied to the pipe behind the machine. The head 17 is provided with a plurality of nozzles 28 arranged around its periphery for directing streams of fluid forwardly of the machine against the interior of the pipe to wash away accumulated debris. Centrally of the head 17 I provide a valve means 30, for the purpose of controlling flow of water through the head other than what takes place through the nozzles 28. The valve means 30 comprises a sleeve 31 having flared ends 32 at each end. The sleeve accommodates with clearance a hollow valve member, designated 34, having a rear set of ports 35 and a forward set 36. This is carried upon a stem 37 which extends slidably through a boss 38 of a yoke 39. The yoke is shown as comprising a base 40 which is secured to the head 16 by bolts 41. Four straps 42 extend from the base to the boss 35. The stem is provided with a threaded end portion 37' upon which are a pair of nuts 44 and a washer 45. Between the washer and the yoke is a compression coil spring 48. The stem is also threaded at 50 in the region adjacent the valve 34 so that the travel of the valve under the influence of the spring 48 may be adjustably limited by nuts 52.

In the operation of the device the machine is inserted in the pipe or conduit to be cleaned in the conventional manner, and fluid under pressure, ordinarily water, supplied behind the machine at a fixed rate of flow sufficient to move the machine through the pipe. Valve means 30 is adjusted in accordance with local conditions. Should the resistance of the machine to movement increase due to heavy encrustation or tuberculation in the pipe, the speed of travel of the machine will decrease and the fluid pressure will rise behind the machine, causing valve 34 to move from the position of Fig. 2 into the sleeve approximately to the position shown in broken lines in Fig. 4. This reduces the flow of fluid through the head 17 since it restricts access of the fluid behind the machine to the ports 35 of valve 34, reducing flow through the interior of the valve, and results in a further build-up of pressure behind the machine which ordinarily will serve to keep the machine moving and increase its speed. If, for any reason, the machine should strike an obstruction or be so hindered in its passage that it cannot move and comes to a complete stop, valve 34 will be forced out of the sleeve against the action of spring 48 by the increase of fluid pressure to the position in which which it is shown in full lines in Fig. 4. The valve means 30 will then serve as a safety valve to prevent build-up of undue pressure behind the machine to the point where damage would occur.

Depending upon the size of the machine, one or several such valve means 30 may be employed. Thus in Fig. 5 I show a head 17a provided with five such valve means, designated 30a.

Although I have illustrated and described a preferred form of my invention, I contemplate that various changes and modifications can be made therein without departing from the invention, the scope of which is indicated by the following claims.

I claim:

1. In a fluid-operated pipe-cleaning machine, a head adapted to fit slidably in the pipe to be cleaned behind which fluid pressure can be applied to drive the machine through the pipe, means providing an elongated fluid passage through said head, valve means controlling said passage, said valve means including a valve member having a passage therethrough with an inlet port at the periphery of the valve member, means yieldably holding said valve member partially within said passage means in a position such that fluid behind said head can freely enter the inlet port of said valve and flow therethrough, said valve member being movable further into said passage under the influence of fluid pressure whereby access of fluid to said port is restricted thereby limiting flow of fluid through said valve member and said passage, said valve member being further movable through said passage to a position therebeyond under the influence of increased fluid pressure whereby to leave said passage substantially unrestricted.

2. A pipe-cleaning machine as set forth in claim 1 in which said head is provided with a plurality of unrestricted fluid passages of predetermined cross section for passing a limited quantity of fluid through the head to flush away debris in front of the machine.

3. A pipe-cleaning machine as set forth in claim 1 in which means is provided for adjusting the effectiveness of the means for yieldably holding the valve member.

4. In a valved passage means, a sleeve adapted to form a fluid passage, a valve member comprising a tubular body having a closed end and having an inlet port in its periphery adjacent the closed end, said body being open at a region spaced axially of the inlet port, means supporting said valve member for movement axially of said sleeve, said valve member and sleeve being proportioned to provide an annular clearance space therebetween, said valve member normally being positioned with its closed end upstream of said sleeve exposing said inlet port and being movable downstream through said sleeve to a position beyond said sleeve, and means yieldably resisting movement of said valve body downstream further into and beyond said sleeve.

5. A valved passage means as set forth in claim 4 in which said sleeve comprises a central cylindrical portion and outwardly flared end portions and in which the portion of said valve member having the inlet port is cylindrical.

References Cited in the file of this patent

UNITED STATES PATENTS

| | | |
|---|---|---|
| 934,283 | Cole | Sept. 14, 1909 |
| 1,631,562 | Thompson et al. | June 7, 1927 |
| 2,263,774 | Heltzel et al. | Nov. 25, 1941 |
| 2,315,133 | Riney et al. | Mar. 30, 1943 |
| 2,604,647 | Stephens | July 29, 1952 |